United States Patent
Hardjono et al.

(10) Patent No.: US 8,139,588 B2
(45) Date of Patent: **\*Mar. 20, 2012**

(54) METHOD AND APPARATUS TO ESTABLISH ROUTES BASED ON THE TRUST SCORES OF ROUTERS WITHIN AN IP ROUTING DOMAIN

(75) Inventors: Thomas Parasu Hardjono, Portland, OR (US); David Maurits Bleckmann, Portland, OR (US); William Wyatt Starnes, Portland, OR (US); Bradley Douglas Andersen, Tigard, OR (US)

(73) Assignee: Harris Corporation, Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/777,114

(22) Filed: May 10, 2010

(65) Prior Publication Data

US 2010/0218236 A1    Aug. 26, 2010

Related U.S. Application Data

(63) Continuation of application No. 11/624,001, filed on Jan. 17, 2007, now Pat. No. 7,733,804, and a continuation-in-part of application No. 11/608,742, filed on Dec. 8, 2006, and a continuation-in-part of application No. 11/288,820, filed on Nov. 28, 2005, now Pat. No. 7,272,719.

(60) Provisional application No. 60/824,740, filed on Sep. 6, 2006, provisional application No. 60/759,742, filed on Jan. 17, 2006, provisional application No. 60/749,368, filed on Dec. 9, 2005, provisional application No. 60/637,066, filed on Dec. 17, 2004, provisional application No. 60/631,449, filed on Nov. 29, 2004, provisional application No. 60/631,450, filed on Nov. 29, 2004.

(51) Int. Cl.
*H04L 12/28* (2006.01)

(52) U.S. Cl. ........................................ 370/400; 709/238

(58) Field of Classification Search .................... None
See application file for complete search history.

(56) References Cited

U.S. PATENT DOCUMENTS 5,465,299 A    11/1995    Matsumoto et al.
(Continued)

FOREIGN PATENT DOCUMENTS

WO    WO 00/48063 A1    8/2000
(Continued)

OTHER PUBLICATIONS

Liu et al., "A Dynamic Trust Model for Mobile Ad Hoc Networks", May 26, 2004, IEEE, Proceedings of the 10th IEEE Internation Workshop on Future Trends of Distributed Computing Systems (FTDCS'04), pp. 80-85.

*Primary Examiner* — Chirag Shah
*Assistant Examiner* — Otis L Thompson, Jr.
(74) *Attorney, Agent, or Firm* — Marger Johnson & McCollom, P.C.

(57) ABSTRACT

A router includes a management module and a routing module. The routing module can be used to route data around a network. The management module can be used to manage the operation of the routing module, including generating an integrity report for the router, which can be used to generate a trust report for the router. The trust report can include an integrity/trust score for the router. The management module can control the routing module via a secure control interface.

17 Claims, 14 Drawing Sheets

U.S. PATENT DOCUMENTS

| | | | |
|---|---|---|---|
| 5,535,276 A | 7/1996 | Ganesan | |
| 5,919,257 A | 7/1999 | Trostle | |
| 6,157,721 A | 12/2000 | Shear et al. | |
| 6,209,091 B1 | 3/2001 | Sudia et al. | |
| 6,289,460 B1 | 9/2001 | Hajmiragha | |
| 6,327,652 B1 | 12/2001 | England et al. | |
| 6,393,420 B1 | 5/2002 | Peters | |
| 6,470,448 B1 | 10/2002 | Kuroda et al. | |
| 6,609,200 B2 | 8/2003 | Anderson et al. | |
| 6,823,454 B1 | 11/2004 | Hind et al. | |
| 6,826,690 B1 | 11/2004 | Hind et al. | |
| 6,950,522 B1 | 9/2005 | Mitchell et al. | |
| 6,976,087 B1 | 12/2005 | Westfall et al. | |
| 6,978,366 B1 | 12/2005 | Ignatchenko et al. | |
| 7,003,578 B2 | 2/2006 | Kanada et al. | |
| 7,024,548 B1 | 4/2006 | O'Toole, Jr. | |
| 7,100,046 B2 | 8/2006 | Balaz et al. | |
| 7,114,076 B2 | 9/2006 | Callaghan | |
| 7,178,030 B2 | 2/2007 | Scheidt et al. | |
| 7,233,942 B2 | 6/2007 | Nye | |
| 7,268,906 B2 | 9/2007 | Ruhl et al. | |
| 7,272,719 B2 | 9/2007 | Bleckmann et al. | |
| 7,383,433 B2 | 6/2008 | Yeager et al. | |
| 7,457,951 B1 | 11/2008 | Proudler et al. | |
| 7,461,249 B1 | 12/2008 | Pearson et al. | |
| 7,574,600 B2 | 8/2009 | Smith | |
| 2002/0069129 A1 | 6/2002 | Akutsu et al. | |
| 2002/0095589 A1 | 7/2002 | Keech | |
| 2002/0144149 A1 | 10/2002 | Hanna et al. | |
| 2002/0150241 A1 | 10/2002 | Scheidt et al. | |
| 2003/0014755 A1 | 1/2003 | Williams | |
| 2003/0018890 A1 | 1/2003 | Hale et al. | |
| 2003/0028585 A1 | 2/2003 | Yeager et al. | |
| 2003/0030680 A1 | 2/2003 | Cofta et al. | |
| 2003/0097581 A1 | 5/2003 | Zimmer | |
| 2003/0177394 A1 | 9/2003 | Dozortsev | |
| 2004/0107363 A1 | 6/2004 | Monteverde | |
| 2004/0205340 A1 | 10/2004 | Shimbo et al. | |
| 2005/0033987 A1 | 2/2005 | Yan et al. | |
| 2005/0048961 A1 | 3/2005 | Ribaudo et al. | |
| 2005/0132122 A1 | 6/2005 | Rozas | |
| 2005/0138417 A1 | 6/2005 | McNerney et al. | |
| 2005/0163317 A1 | 7/2005 | Angelo et al. | |
| 2005/0184576 A1 | 8/2005 | Gray et al. | |
| 2005/0257073 A1 * | 11/2005 | Bade et al. | 713/193 |
| 2005/0278775 A1 | 12/2005 | Ross | |
| 2006/0005254 A1 | 1/2006 | Ross | |
| 2006/0015722 A1 | 1/2006 | Rowan et al. | |
| 2006/0048228 A1 | 3/2006 | Takemori et al. | |
| 2006/0074600 A1 | 4/2006 | Sastry et al. | |
| 2006/0173788 A1 | 8/2006 | Nath Pandya et al. | |
| 2007/0050622 A1 | 3/2007 | Rager et al. | |
| 2007/0130566 A1 | 6/2007 | van Rietschote et al. | |
| 2007/0143629 A1 | 6/2007 | Hardjono et al. | |
| 2007/0174429 A1 | 7/2007 | Mazzaferri et al. | |
| 2007/0180495 A1 | 8/2007 | Hardjono | |
| 2008/0092235 A1 | 4/2008 | Comlekoglu | |
| 2008/0256363 A1 | 10/2008 | Balacheff et al. | |
| 2009/0089860 A1 | 4/2009 | Forrester et al. | |

FOREIGN PATENT DOCUMENTS

| | | |
|---|---|---|
| WO | WO2006/058313 A2 | 6/2006 |
| WO | WO2008/024135 A3 | 2/2008 |
| WO | WO/2008/030629 A1 | 3/2008 |
| WO | WO/2009/018366 A1 | 2/2009 |

* cited by examiner

| Router ID | Platform ID | I/TS | Alg. Type | Date/Time | Dig. Sig. | Issuer Cert. |

METHOD AND APPARATUS TO ESTABLISH ROUTES BASED ON THE TRUST SCORES OF ROUTERS WITHIN AN IP ROUTING DOMAIN

RELATED APPLICATION DATA

This application is a continuation of commonly-assigned U.S. application Ser. No. 11/624,001, filed Jan. 17, 2007, now U.S. Pat. No. 7,733,804, issued Jun. 8, 2010, which claims the benefit of commonly-assigned U.S. Provisional Patent Application Ser. No. 60/824,740, filed Sep. 6, 2006, titled "METHOD AND APPARATUS TO ESTABLISH ROUTES BASED ON THE TRUST SCORES OF ROUTERS WITHIN AN IP ROUTING DOMAIN," and is a continuation-in-part of commonly-assigned U.S. patent application Ser. No. 11/608,742, filed Dec. 8, 2006, titled "METHOD TO VERIFY THE INTEGRITY OF COMPONENTS ON A TRUSTED PLATFORM USING INTEGRITY DATABASE SERVICES," which claims the benefit of commonly-assigned U.S. Provisional Patent Application Ser. No. 60/749,368, filed Dec. 9, 2005, titled "METHOD TO VERIFY THE INTEGRITY OF COMPONENTS ON A TRUSTED PLATFORM USING INTEGRITY DATABASE SERVICES," and commonly-assigned U.S. Provisional Patent Application Ser. No. 60/759,742, filed Jan. 17, 2006, titled "METHOD AND APPARATUS FOR IP NETWORK ACCESS CONTROL BASED ON PLATFORM COMPONENT SIGNATURES AND TRUST SCORES."

U.S. patent application Ser. No. 11/608,742 is also a continuation-in-part of commonly-assigned U.S. patent application Ser. No. 11/288,820, filed Nov. 28, 2005, now U.S. Pat. No. 7,272,719, issued Sep. 18, 2007, titled "Method to control access between network endpoints based on trust scores calculated from information system component analysis," which claims the benefit of commonly-assigned U.S. Provisional Patent Application Ser. No. 60/631,449, filed Nov. 29, 2004, titled "METHOD TO HARVEST, SUBMIT, PERSIST, AND VALIDATE DATA MEASUREMENTS EMPLOYING WEB SERVICES," commonly-assigned U.S. Provisional Patent Application Ser. No. 60/631,450, filed Nov. 29, 2004, titled "METHOD TO VERIFY SYSTEM STATE AND VALIDATE INFORMATION SYSTEM COMPONENTS BY MEANS OF WEB SERVICES USING A DATABASE OF CRYPTOGRAPHIC HASH VALUES", and commonly-assigned U.S. Provisional Patent Application Ser. No. 60/637,066, filed Dec. 17, 2004, titled "METHOD TO CONTROL ACCESS BETWEEN NETWORK ENDPOINTS BASED ON TRUST SCORES CALCULATED FROM INFORMATION SYSTEM COMPONENTS", all of which are hereby incorporated by reference.

FIELD OF THE INVENTION

This invention pertains to routers, and more particularly to determining and using the integrity of a router in its operations.

BACKGROUND OF THE INVENTION

Of late, the concept of trusted computing hardware has become more important. Trusted computing often involves placing a piece of trusted hardware within a computer. Examples of such trusted hardware include the trusted platform module (TPM), for which the specifications have been defined by the Trusted Computing Group (TCG) consortium. Trusted hardware often includes tamper-resistant hardware. If someone attempts to use the hardware in a way other than how it was designed, for example, by attempting to disassemble the hardware, the trusted hardware becomes unusable.

Trusted hardware's use in computers helps to provide a measure of certainty about the identity of the computer. But how much the computer can be trusted, or even if the computer can be trusted at all, is a separate issue. For example, even though a computer might include trusted hardware, the presence of the trusted hardware does not provide any protection against a virus, which might then be spread to another computer.

Routers, as compared with general-purpose computers, tend to be specialized devices. A router is responsible for directing traffic around a network. The router receives data, usually in packets, and uses information in the packets to determine where the data came from, and to where the data is supposed to be directed. Sometimes the router is connected to the destination of the data; sometimes the router needs to select another router in the network to deliver the data, in the hopes that the other router is closer to the data destination. But trusted hardware, which meets a particular need for general purpose computers, have not yet found their way into routers. As yet, there is no way to determine the integrity of a router, or to use such information in the normal operation of a router.

Accordingly, a need remains for a way to determine the integrity of a router and to use that information in routing data, to address these and other problems associated with the prior art.

SUMMARY OF THE INVENTION

The invention includes a router. The router includes a routing module responsible for routing data. The router also includes a management module, used to control the routing module via a secure control interface.

The foregoing and other features, objects, and advantages of the invention will become more readily apparent from the following detailed description, which proceeds with reference to the accompanying drawings.

DETAILED DESCRIPTION

Figure 1:
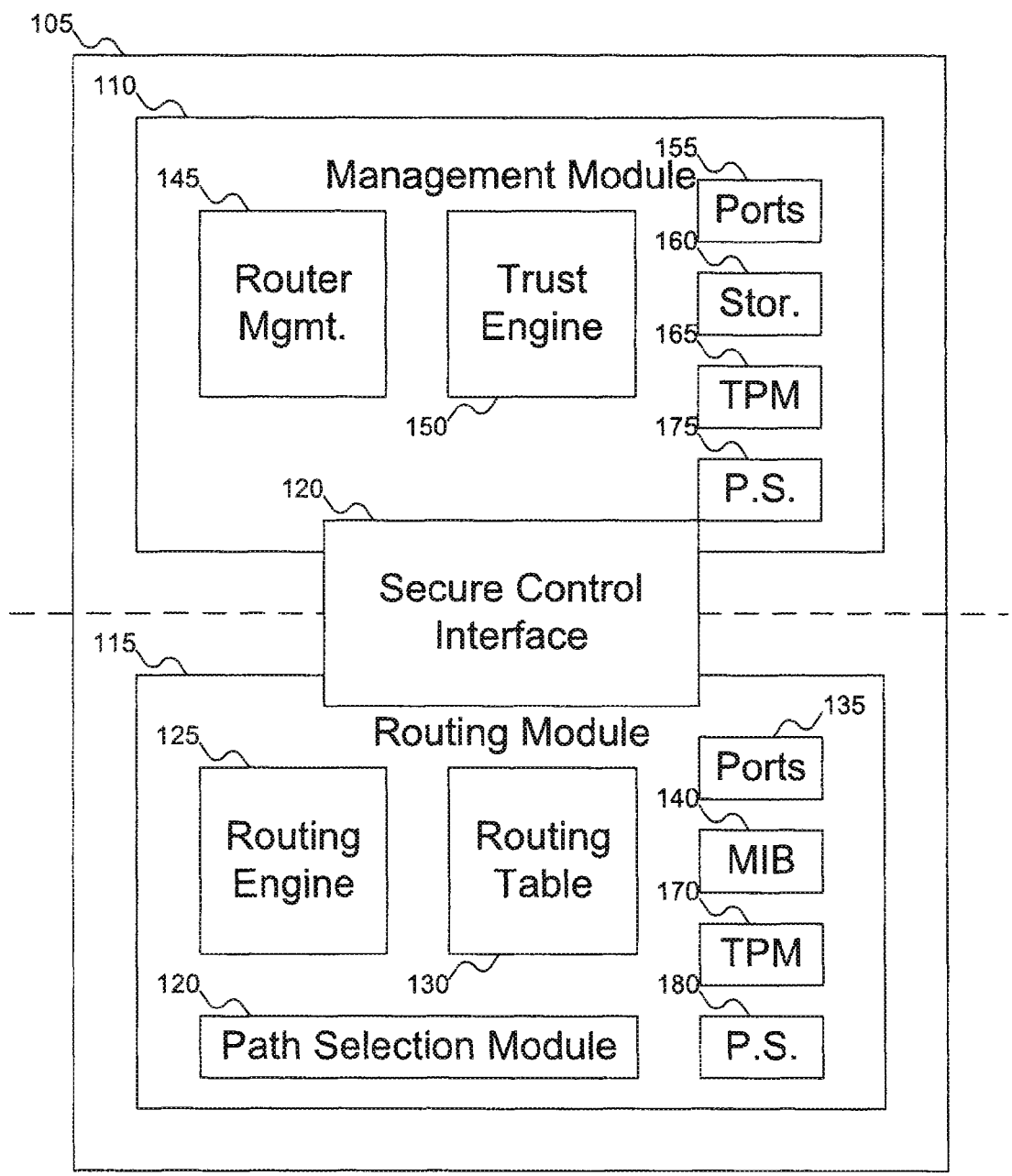
FIG. 1 shows a router including a routing module and a management module, according to an embodiment of the invention.

FIG. 1 shows a router including a routing module and a management module, according to an embodiment of the invention. In FIG. 1, router 105 includes management module 110 and routing module 115. The two modules are connected by secure control interface 120, which enables management module 110 to control routing module 115.

Routing module 115 is similar to standard routers, and includes routing engine 125, routing table 130, ports 135, and management information base 140. Routing module 115 receives data via ports 135 and uses routing table 130 to route the data around the network (sending the data out via ports 135 to other routers or machines). Routing engine 125 and routing table 130 are slightly different from the standard routing engine and routing table, in that routing engine 125 and routing table 130 are modified to use integrity/trust score information. Routing engine 125 and routing table 130 are discussed below with reference to FIGS. 11 and 12-13. Routing module 115 uses ports 135 to communicate with the rest of the network, both for input and output of data. Management information base 140 stores management parameters for routing module 115.

In contrast with routing module 115, management module 110 is responsible for managing router 105, and in particular managing routing module 115. Management module 110 includes router management module 145, trust engine 150, ports 155, and storage 160. Router management module 145 is responsible for managing routing module 115, via secure control interface 120. Trust engine 150 is responsible for the router's involvement in generating an integrity/trust score. The generation of an integrity/trust score is discussed more in related U.S. patent application Ser. No. 11/288,820, titled "METHOD TO CONTROL ACCESS BETWEEN NETWORK ENDPOINTS BASED ON TRUST SCORES CALCULATED FROM INFORMATION SYSTEM COMPONENT ANALYSIS", filed Nov. 28, 2005, and related U.S. patent application Ser. No. 11/608,742, titled, "METHOD TO VERIFY THE INTEGRITY OF COMPONENTS ON A TRUSTED PLATFORM USING INTEGRITY DATABASE SERVICES", filed Dec. 8, 2006, which are incorporated by reference. Trust engine 150 is discussed further with reference to FIG. 8 below.

Management module 110 uses ports 155 as control input/output interfaces. That is, ports 155 provide a mechanism for an appropriate user to control management module 110. If appropriate, ports 155 can also be used to control routing module 115, although typically such control is managed via secure control interface 120.

Management module 110 uses storage 160 to store information. For example, storage 160 can be used to store information about integrity records about components in router 105. The use of these integrity records is discussed further below.

Management module 110 and routing module 115 can each include a trusted platform module (TPM) 165 and 170, respectively. Although FIG. 1 shows the use of TPM modules, a person skilled in the art will recognize that any trusted hardware can be used in place of the TPM shown, and that further references to TPMs are intended to encompass any alternative trusted hardware. TPM modules 165 and 170 perform their standard functions: to provide keys and certificates that are specific to the modules in which the TPM modules are installed. TPMs 165 and 170 can be physically bound to management module 110 and routing module 115, respectively, so that an attempt to disassemble or otherwise force information out of TPMs 165 and 170 would make TPMs 165 and 170 inoperative.

TPMs 165 and 170, as typical TPMs, can store keys and certificates. For example, TPMs 165 and 170 can store Endorsement Key (EK) public key pairs and certificates, installed by the TPM manufacturer. TPMs 165 and 170 can also store platform certificates, issued by the platform manufacturer, which provides an attestation that the platform meets the specifications of the TCG. The TPMs can also store Attestation Identity Keys (AIK) keys and AIK certificates. These keys and certificates are issued by the platform certification authority, which "anonymize" the identity of the platform, thereby protecting the privacy of the owner of the machine. Typically, a platform certification authority will not issue an AIK-certificate unless the EK-certificate and the platform certificate are successfully evaluated. The TPMs can also store Subject Key Attestation Evidence (SKAE) certificates, which are X.509 certificates containing special non-mandatory extension fields to hold information about the trusted platform from which the X.509 certificate was enrolled. Router 105 can use these keys and certificates for various purposes: aside from signing the integrity report (for example, see below with reference to FIG. 12), router 105 can also use these keys and certificates to sign route advertisements and routing updates.

FIG. 1 also shows management module 110 and routing module 115 each with separate power supplies 175 and 180, respectively. In standard modules, which do not include management module 110, a single power supply provides power to the router. In router 105, by providing separate power supplies 175 and 180, it is possible for routing module 115 to continue to operate even if power supply 175 fails, which would mean that management module 110 would not be operating. Of course, if management module 110 is not operating, then router 105 operates as an ordinary router, without the capabilities offered by management module 110.

Secure control interface 120 provides a trusted control path from management module 110 to routing module 115. Secure control interface is designed to be effectively a one-way interface: while management module 110 can control routing module 115, routing module 115 should not be able to access management module 110 via secure control interface 120 (or indeed, in any other manner). Examples of commands management module 110 can issue to routing module 115 via secure control interface 120 include "turn on", "turn off", "reboot", "store data in the routing module TPM", "erase data from the routing module TPM", etc. (Normally, data stored or erased from the routing module TPM using such commands would only affect data that can be managed by the network administrator: for example, management module 110 would not be able to delete certificates and/or keys placed there by the platform manufacturer, but a person skilled in the art will recognize that in some embodiments the commands might enable management module 110 to erase data provided by parties other than the user of router 105.)

By separating management routing capabilities within router 105, router 105 effectively operates on two planes. Management module 110 is responsible for controlling the management plane, and routing module 115 is responsible for controlling the data plane. While FIG. 1 suggests that router 105 can be a single box including both management module 110 and routing module 115, a person skilled in the art will recognize that this is not required. Management module 110 and routing module 115 can be separate pieces of hardware, with appropriate connections (e.g., to provide secure control interface 120). For example, management module 110 and routing module 115 can be implemented as blades. Further, there is no requirement that there be a one-to-one correspondence between management module 110 and routing module 115: a single management module 110 might be responsible for managing multiple routing module 115. In the discussion below, any reference to router 105 is intended to refer to the combination of management module 110 and routing module 115, whether or not combined into a single device.

Router 105 can use a specialized boot sequence that takes advantage of the added components to evaluate the router. Specifically, router 105 can use trust engine 150 to generate an integrity record for each component, hardware and/or software, in router 105. These integrity records can then be assembled into an integrity report. The integrity records can include digests of the components, which can be cryptographic hashes, as discussed further below with reference to FIG. 12. The integrity report can be analyzed to determine whether the components in router 105 are recognized and trustable, and to what extent they are trustable. Such analysis can include comparing the digests of the components to known digests that are known to be good values for the components: these known good digests can be stored in non-volatile storage within TPMs 165 and 170, or these known good digests can be accessed from elsewhere, such as in a database of known good digest values. (If the known good digests are stored in non-volatile storage within TPMs 165 and 170, the known good digests can be stored by the vendor or owner, as part of provisioning TPMs 165 and 170; the party provisioning TPMs 165 and 170 can choose which component digests are considered important enough to store in TPMs 165 and 170, and which component digests do not need to be stored.) The result of this analysis, termed a trust report below, can be stored in storage 160. Provided the integrity report shows router 105 is trustable, router 105 can be operated as expected. If the integrity report indicates that router 105 is not trustable, then router 105 (more specifically, management module 110) can alert a network administrator to the fact router 105 did not boot correctly or as expected. For example, if management module 110 determines that routing module 115 is not configured as expected, management module 110 can alert the network administrator of this fact, then shut down routing module 115 so that it cannot be used until the problem is corrected.

Where management module 110 and routing module 115 are separate devices (for example, when modules 110 and 115 are implemented as blades), it can occur that routing module 115 is booted independently of management module 110. (In fact, even when management module 110 and routing module 115 are within the same physical router 105, it can occur that routing module 115 is booted without effecting any change in the operation of management module 110, if separate power supplies 175 and 180 are used.) In that case, management module 110 does not need to reexamine itself, and the specialized boot sequence described above can be effected only with respect to routing module 115.

Figure 4:
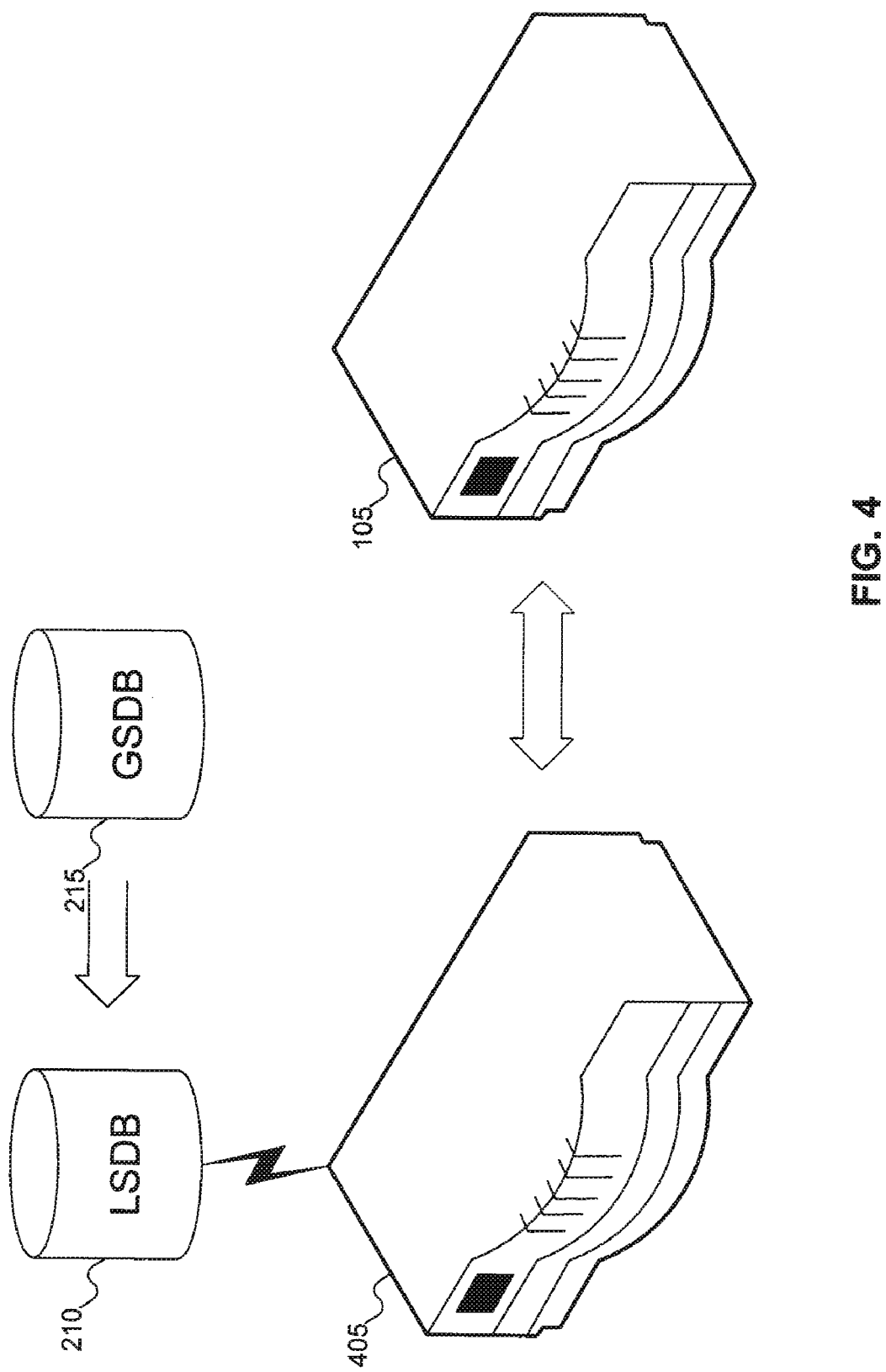
FIG. 4 shows a second router used to determine an integrity/trust score for the router of FIG. 1.

A person skilled in the art will recognize that the specialized boot sequence described above enables router 105 to perform a self-evaluation. But this is not the same thing as generating a trust report for the router, which can include an integrity/trust score. The trust report is usually generated by an external entity, such as the authentication/verification server shown in FIG. 2, or another router as shown in FIG. 4.

While the specialized boot sequence described above is useful in making an internal assessment of the trustworthiness of the router, a person skilled in the art will recognize that upon initial boot in the network, the router also needs to determine the topography of the network, and to find out the trustworthiness of the other routers on the network. Without such information, it can be difficult to generate a trust report for the router, as described below with reference to FIGS. 2-5. For example, until there is an established route along the network between a particular router and an authentication/verification server, the authentication/verification server cannot determine the router's integrity/trust score. Thus, the specialized boot sequence is not the only boot sequence that can be performed, although in one embodiment of the invention the specialized boot sequence is performed first: if the router does not consider itself internally trustworthy, the router can protect the rest of the network by refusing to join the network.

Figure 5:
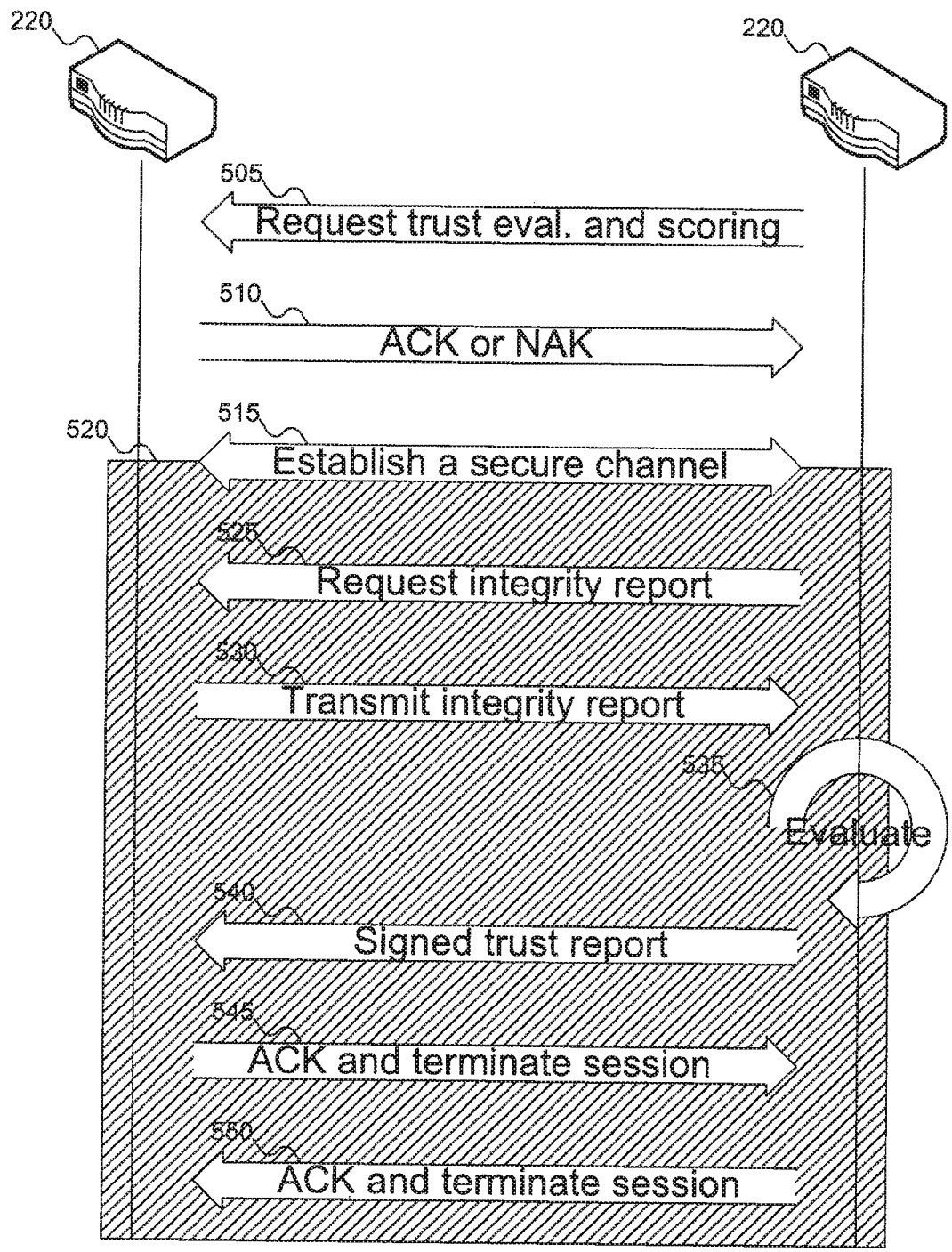
FIG. 5 shows an interchange of messages between the router of FIG. 1 and the second router of FIG. 4, in determining an integrity/trust score for the router of FIG. 1.

As part of joining the network, router 105 can be booted initially as might normally occur. Router 105 can then discover its neighbors and begin creating routing table 130, using standard protocols (such as Open Shortest Path First (OSPF), Intermediate System to Intermediate System (IS-IS), Routing Information Protocol (RIP), Interior Gateway Routing Protocol (IGRP), etc.). Once complete, router 105 would have routing table 130, but without trust score information (see below with reference to FIG. 11 for more information). Router 105 can then be evaluated to determine an integrity/trust score for router 105, as discussed below with reference to FIGS. 2-5. If routers are responsible for evaluating each other as shown in FIGS. 4-5 (called "peer evaluation"), then router 105 should be evaluated by each router that is one-hop away (also called "adjacent"); in a like manner, router 105 should evaluate each of its adjacent routers.

Once router 105 has been evaluated, router 105 can advertise its integrity/trust score. Router advertisement can be accomplished using known techniques, but the (potentially signed) trust report can be included with the router advertisement. By transmitting the trust report with the router advertisement, other routers can insert the integrity/trust score for router 105 into routing table 130, thereby completing the picture of the network for data routing.

While routers can be evaluated for their integrity/trust scores upon boot-up, a person skilled in the art will recognize that there are other reasons why a router can be evaluated to generate a integrity/trust score. For example, integrity/trust scores can have expiration dates/times (for example, see below with reference to FIG. 11). Once the router's integrity/trust score has expired, a new one should be generated for the router. This newly generated trust report can be distributed by the router in a state update message. In one embodiment, router 105 transmits the most current trust report with every state update message, even if the trust report is unchanged. Upon receipt of a new trust report for another router on the network, the recipient router can update routing table 130 accordingly, which can then affect the paths data take through the network. If the network administrator has established a policy indicating how current trust reports need to be (for example, all trust reports need to be no more than one day old), then if a router receives a trust report that is too old, the router can refuse to accept the trust report, and the router can refuse to accept or deliver network traffic to that router until that router provides a current trust report.

In one embodiment, management module 110 and routing module 115 are in a master-slave relationship. That is, management module 110 has the capability to turn on, turn off, and reboot routing module 115. Because management module 110 has its own capabilities for communication independent of routing module 115 (although these capabilities can be kept to a minimum, so as to prevent the possibility of management module 110 being hijacked and used for routing), management module 115 can report problems to the network administrator even when routing module 115 is not operative.

It can happen that management module 110 can fail but routing module 115 continues to operate. To the extent routing module 115 has a trust report, router 105 can continue to operate based on that trust report, although if the trust report expires before management module 110 becomes operative, it might not be possible to generate a new trust report for router 105. Alternatively, router 105 can continue to operate after management module 110 has failed, but router 105 operates as though without a trust report.

Router 105 has many potential applications. The use of integrity/trust scores in routing can provide a degree of trust in the data transmission. Exactly what the "trust" is can depend on the application. Examples of trust can include quality of service and security of data, but a person skilled in the art will recognize other factors that can be trusted. A person skilled in the art will also recognize the applicability of router 105 to almost any application: for example, Voice-over-IP (VoIP).

Figure 2:
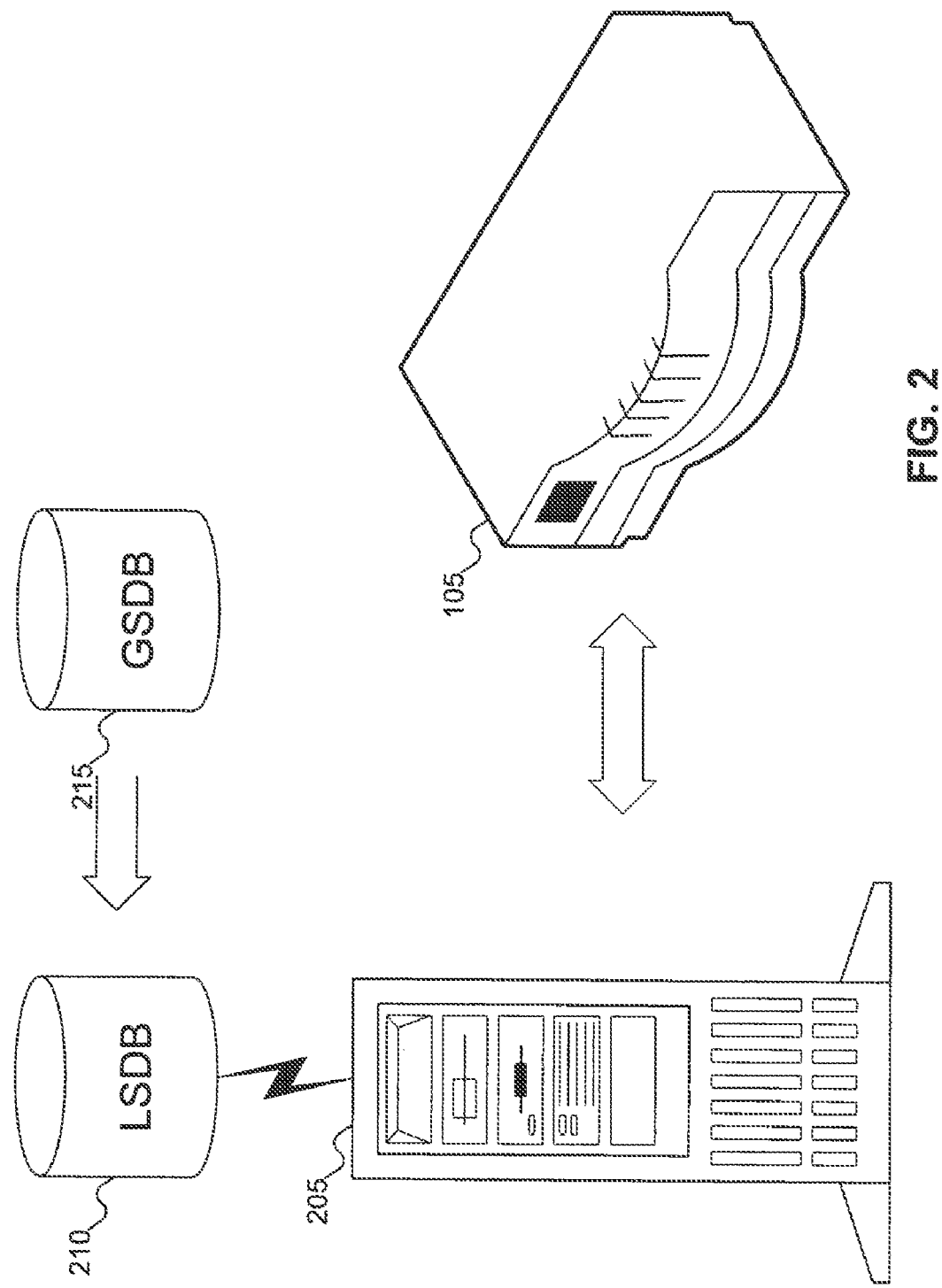
FIG. 2 shows an authentication/verification server used to determine an integrity/trust score for the router of FIG. 1.

FIG. 2 shows an authentication/verification server used to determine an integrity/trust score for the router of FIG. 1. In FIG. 2, router 105 is shown interacting with authentication/verification server 205 to generate a trust report for router 105. Router 105 can find authentication/verification server 205 by discovering it on the network, or the network administrator can include information about how to contact authentication/verification server 205 (for example, the IP address of authentication/verification server 205).

When authentication/verification server 205 is responsible for generating trust reports for routers, the technique is called the "centralized evaluation approach". Although FIG. 2 shows authentication/verification server 205 as a single server, a person skilled in the art will recognize that the functions of authentication/verification server 205 can be split among multiple machines. For example, related U.S. patent application Ser. No. 11/608,742, titled, "METHOD TO VERIFY THE INTEGRITY OF COMPONENTS ON A TRUSTED PLATFORM USING INTEGRITY DATABASE SERVICES", filed Dec. 8, 2006, which is incorporated by reference, shows the possibility of authentication/verification server 205 being split into three components: an authentication server, a verification server, and a policy server. In a similar manner, the functions of authentication/verification server 205 can be separated into separate machines, in any desired configuration.

While FIG. 2 shows router 105 interacting with authentication/verification server 205, a person skilled in the art will recognize that authentication/verification server actually interacts with the management module of router 105, as the management module is responsible for generating the integrity report and determining the level of trust applicable router 105 (or more specifically, the routing module in router 105). For example, if the management module and the routing module of router 105 are implemented as separate blades, a single management module might be responsible for interacting with authentication/verification server on behalf of any number of routing modules.

Router 105 generates an integrity report, which provides information about components in router 105; such information can include, for example, cryptographic hashes of the components. Router 105 provides the integrity report to authentication/verification server 205, which compares the information about the components in router 105 to known good values for those components.

To generate the trust report and the integrity/trust score, authentication/verification server 205 compares the information about the components in the integrity report from router 105 to known good values for those components. The known good values can be stored in local signature database 210, which is stored locally to authentication/verification server 205. As new database entries become available, local signature database 210 can be updated from global signature database 215. Alternatively, authentication/verification server 205 can access the known good values stored in global signature database 215 instead of local signature database 210 (for example, if there is no local signature database), or some combination of databases 210 and 215, as appropriate. Authentication/verification server 205 can then use the results of those comparisons to generate the trust report for router 105; the trust report can include an integrity/trust score for router 105.

Once authentication/verification server 205 has identified which components are recognized and which are not, authentication/verification server 205 can generate a trust report, which can include an integrity/trust score based on this information. The integrity/trust score can also be called a domain-specific integrity/trust score, as it can be viewed in the context of the network including the router. The integrity/trust score can be based on how many components in router 105 were recognized and how many were not recognized, which components were recognized or not, the source of the information in databases 210 and 215 for the various components, and so on. More information about the generation of the integrity/trust score can be found in related U.S. patent application Ser. No. 11/288,820, titled "METHOD TO CONTROL ACCESS BETWEEN NETWORK ENDPOINTS BASED ON TRUST SCORES CALCULATED FROM INFORMATION SYSTEM COMPONENT ANALYSIS", filed Nov. 28, 2005, and related U.S. patent application Ser. No. 11/608,742, titled, "METHOD TO VERIFY THE INTEGRITY OF COMPONENTS ON A TRUSTED PLATFORM USING INTEGRITY DATABASE SERVICES", filed Dec. 8, 2006, which are incorporated by reference.

Figure 3:
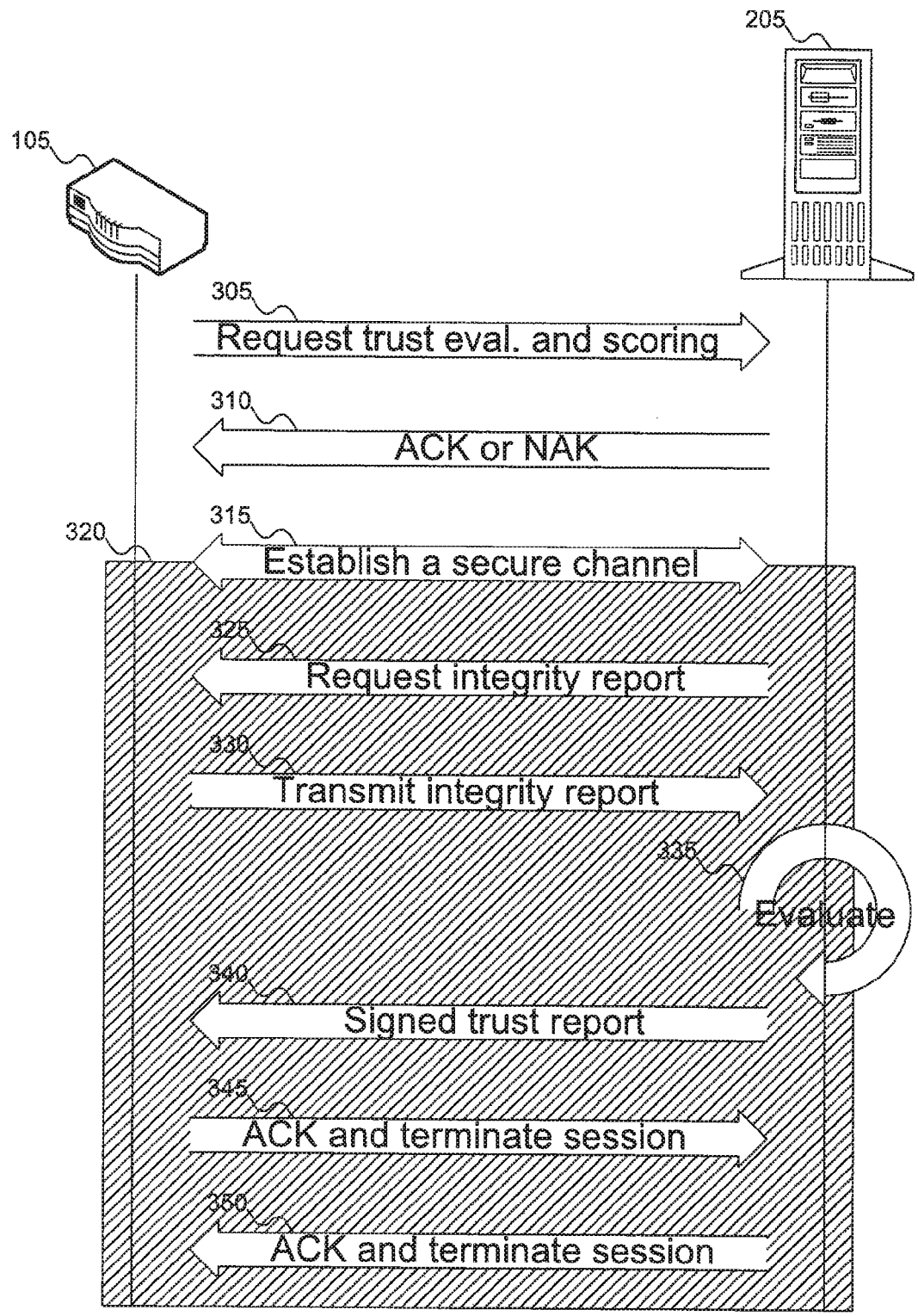
FIG. 3 shows an interchange of messages between the router of FIG. 1 and the authentication/verification server of FIG. 2, in determining an integrity/trust score for the router of FIG. 1.

FIG. 3 shows an interchange of messages between the router of FIG. 1 and the authentication/verification server of FIG. 2, in determining an integrity/trust score for the router of FIG. 1. The generation of the trust report is generally described in related U.S. patent application Ser. No. 11/608, 742, titled, "METHOD TO VERIFY THE INTEGRITY OF COMPONENTS ON A TRUSTED PLATFORM USING INTEGRITY DATABASE SERVICES", filed Dec. 8, 2006, which is incorporated by reference. In communication 305, router 105 requests that authentication/verification server 205 perform a trust evaluation. In communication 310, authentication/verification server 205 either acknowledges the request, or rejects the request. In communication 315, router 105 and authentication/verification server 205 establish a secure channel. (While FIG. 3 suggests that communication 315 is a single message, a person skilled in the art will recognize that communication 315, or any other communication shown in FIG. 3, can involve multiple messages.) The secure channel can be established using any desired protocol: for example, 802.1x, Transport Layer Security (TLS), Secure Sockets Layer (SSL), Internet Key Exchange (IKE). The secure channel is represented in FIG. 3 by shaded box 320. In the handshake used to establish the secure channel, any desired certificates can be used. For example, router 105 can use certificates from its TPM, and authentication/verification server 205 can use an identity certificate, or certificates from its TPM if authentication/verification server 205 includes a TPM.

Once the secure channel is established, in communication 325, authentication/verification server 205 requests the integrity report from router 105. In communication 330, router 105 sends the integrity report to authentication/verification server 205. The integrity report can be signed by router 105, if desired. In communication 335, authentication/verification server 205 evaluates the integrity report to generate the trust report and the integrity/trust score for router 105. Although it would appear that communication 335 is entirely internal to authentication/verification server 205, a person skilled in the art will recognize that generating the trust report and the integrity/trust score can involve communications: for example, requesting information about components of router 105 from a signature database (which, as shown in FIG. 2, can be either local or global), or transmitting information to other machines to perform parts of the process. In communication 340, authentication/verification server 205 transmits the trust report, which can be signed using a key or certificate assigned to authentication/verification server 205, to router 105. In communications 345 and 350, router 105 and authentication/verification server 205 acknowledge that the process is complete, and terminate the session (which includes ending the secure channel between router 105 and authentication/verification server 205).

To prevent against the possibility of a "man in the middle" attack, where a party intercepts communications between router 105 and authentication/verification server 205, acting like the other party and relaying data as appropriate, router 105 can include a secret in its TPMs (for example, in the TPM in the management module of router 105) that is shared with authentication/verification server 205. (The TPM can store the shared secret as part of the network administrator provisioning the TPM.) Because both router 105 and authentication/verification server 205 know the shared secret, they can challenge each other to verify that they both know the shared secret. If one challenge (or both) fail, router 105 and authentication/verification server 205 can break the connection, to prevent the "man in the middle" from obtaining useful information.

In FIG. 2, authentication/verification server 205 tends to be passive. That is, authentication/verification server 205 waits for a router, such as router 105, to request the generation of the trust report. In contrast, FIG. 4 shows a second router used to determine an integrity/trust score for the router of FIG. 1. When one router evaluates another router (called the "peer evaluation approach"), the router performing the evaluation actively requests the router to be evaluated to cooperate in the generation of the trust report. As with authentication/verification server 205 in FIG. 2, router 405 in FIG. 4 receives an integrity report from router 105 and uses this information, in conjunction with databases 210 and/or 215, to generate a trust report and an integrity/trust score. In one embodiment, router 405 only evaluates routers that are directly connected to it (that is, one-hop away from router 405), such as router 105. In another embodiment, a router can evaluate routers anywhere on the network. A person skilled in the art will recognize that if each router evaluates every router on the network, the number of such evaluations grows as the square of the number of routers on the network, so where the network includes a large number of routers (however "large" is defined), such direct evaluation of each router by every other router might be less than desirable.

FIG. 5 shows an interchange of messages between the router of FIG. 1 and the second router of FIG. 4, in determining an integrity/trust score for the router of FIG. 1. As can be seen by comparing FIG. 5 with FIG. 3 above, communication 505 originates from the evaluating router; communication 510 indicates whether router 105 is willing to cooperate in the evaluation of router 105. But the remaining communications (515, 520, 525, 530, 535, 540, 545, and 550) between router 405 and router 105 are similar to or the same as communications 315, 325, 330, 335, 340, 345, and 350 between authentication/verification server 205 and router 105. Note that as router 405 should include a TPM, router 405 can use a certificate in its TPM as part of the handshake with router 105 in establishing the secure connection.

Whether router 105 is evaluated by authentication/verification server 205 as shown in FIGS. 2-3 or by router 405 as shown in FIGS. 4-5, the evaluating device can sign the trust report, using a key or certificate in the evaluating device's TPM. The signature enables a machine reading the trust report to know with certainty which device generated the trust report.

Figures 6, 7:
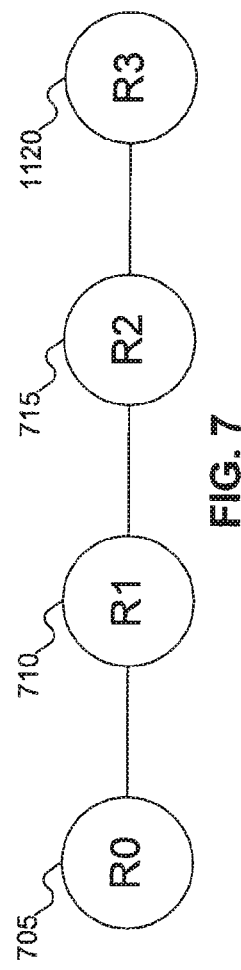
FIG. 6 shows a trust report as can be issued by the authentication/verification server of FIG. 2 or the second router of FIG. 4.
FIG. 7 shows a network of four routers, used to illustrate trust convergence in a network using peer evaluation.

FIG. 6 shows a trust report as can be issued by the authentication/verification server of FIG. 2 or the second router of FIG. 4. In FIG. 6, trust report 605 is shown as including a number of fields. Router ID 610 stores the identity of the router as known within the routing domain. This identity is configured by the network administrator, and in practice can be the same identifier as used by the routing protocol being deployed in the domain (e.g. router ID in the OSPF protocol, see below). Platform ID 615 stores the identity of the router as a trusted platform. This identifier can be the AIK-public-key of the TPM hardware within the router, or some other platform-bound identity. Integrity/trust score 620 stores the integrity/trust score generated for the router, in some representation (for example, string or numeric). The network administrator can select the integrity/trust score calculation algorithm used to compute integrity/trust score 620; the selected integrity/trust score calculation algorithm used is identified in algorithm type 625. Date/time 630 stores the date and time when the integrity/trust score was calculated. Digital signature 635 stores the digital signature that covers all the preceding fields in the Trust Report. Digital signature 630 is used to authenticate the data in trust report 605 and provide integrity protection against unauthorized modifications to a trust report 605. Issuer Certificate 640 is the digital certificate (for example, in X.509 standard format) of the entity that signed trust report 605. In the centralized evaluation approach, this entity would be the trusted entity (for example, the authentication/verification server) that evaluated the router. In the peer evaluation approach, this entity would be another router in the same domain.

One important concept is the concept of trust convergence. "Trust convergence" refers to the goal of all routers in the network having a consistent view of the integrity/trust score for a given router. Where trust reports are generated using the centralized evaluation approach, this is relatively simple. Upon receiving a trust report from a given router, the recipient can verify the signature applied to the trust report by the centralized authority (such as the authentication/verification server of FIGS. 2-3). Once the trust report is verified, the recipient router can accept the evaluation of the router transmitting the trust report. It should thus be clear that the use of a centralized authority assists in achieving trust convergence.

When trust reports are generated using the peer evaluation approach, trust convergence can take longer. For example, some routers can be slower in evaluating their adjacent neighbors, and it can take time for a trust report to propagate through the network. For example, consider the network shown in FIG. 7, which includes four routers: router R0 (705), router R1 (710), router R2 (715), and router R3 (720). Routers R1 (710) is directly connected to routers R0 (705) and R2 (715), and router R2 (715) is directly connected to routers R1 (710) and R3 (720). In evaluating router R1 (710), the trust reports issued by routers R0 (705) and R2 (715) should produce the same integrity/trust score. Similarly, in evaluating router R2 (715), the trust reports issued by routers R1 (710) and R3 (720) should produce the same integrity/trust score. As each router distributes the trust reports generated in evaluating the router, routers R1 (710) and R2 (715) can each distribute two trust reports with their router advertisements. If the integrity/trust scores of the multiple trust reports do not agree, then the network administrator should be notified, as the discrepancy can indicate some mis-configuration, device failure, or an attack on the routers.

Figure 8:
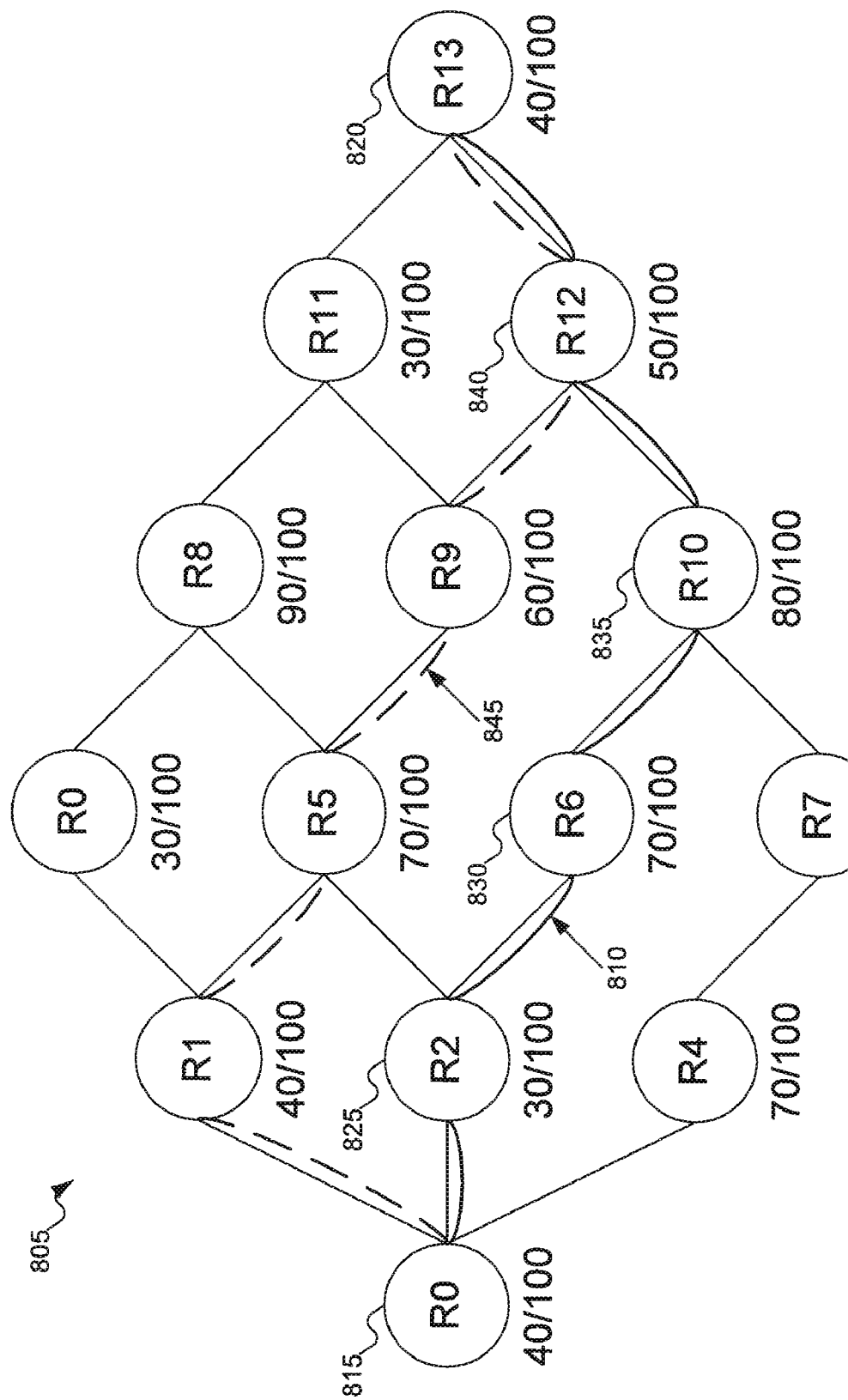
FIG. 8 shows a network of routers like the router of FIG. 1 with integrity/trust scores.

FIG. 8 shows a network of routers like the router of FIG. 1 with integrity/trust scores. It is assumed that the trust scores shown in FIG. 8 were properly determined, and that trust convergence has been achieved. In FIG. 8, network 805 is shown including 14 routers, although a person skilled in the art will recognize that network 805 can include any number of routers in any desired configuration. Path 810 is shown connecting routers 815 and 820. Along path 810, router 815 has an integrity/trust score of 40 out of a maximum possible 100; router 825 has an integrity/trust score of 30 out of a maximum possible 100; router 830 has an integrity/trust score of 70 out of a maximum possible 100; router 835 has an integrity/trust score of 80 out of a maximum possible 100; router 840 has an integrity/trust score of 50 out of a maximum possible 100; and router 820 has an integrity/trust score of 40 out of a maximum possible 100. Thus, the sum of the integrity/trust scores along path 810 is 310.

Path 810 represents one possible path between routers 815 and 820; it should be clear that other paths exist. Path 810 is the path between routers 815 and 825 in network 805 with the highest sum of integrity/trust scores. On the other hand, if the policy is to select a path so that the minimum integrity/trust score along the path is as high as possible, then path 845 can be selected. Thus, the policy for use in selecting paths in network 805 can affect what path is taken between a given pair of routers. Similarly, if routers in network 805 have their integrity/trust scores change (e.g., by changing components), if routers become unavailable, or if the integrity/trust scores have expired (see below with reference to FIG. 11 regarding use-by dates), then other paths might be selected. (A person skilled in the art will recognize that an unavailable router might be considered to have an infinite negative integrity/trust score, to encourage selection of a path that does not use that router.)

Known techniques for path selection, such as distance-vector protocols or link-state protocols, can be modified to factor in integrity/trust scores as part of the path selection process. Distance-vector routing protocols are those which are based on the distance-vector algorithm to compute available routes or paths. In distance-vector routing protocols, each router informs its directly-connected neighbors of its routing table. For each network path, the receiving routers pick the neighbor advertising the lowest cost, and then adds this entry into its routing table (for future advertisement). An example of a standard distance-vector routing protocol is the Routing Information Protocol (RIP), currently version 2 (RIPv2) described in RFC 1723.

Routers participating in a link state routing protocol have a complete knowledge about the entire topology of the network. Periodically, a router can verify the status (i.e. link state) of all its neighboring routers, and then advertise this link status information to other routers through a link state advertisement message, which can be flooded throughout the network. The link state advertisement message can be received by all the routers within the routing domain. Each router can then update its view of the network topology. To reach any destination in the network, a router first computes potential routes, for example by using Dijkstra's shortest path algorithm. An example of a link state routing protocol is the Open Shortest Path First (OSPF) protocol, which is a standard described in RFC 1583. The OSPF packet format can be modified include a trust report pertaining to the router that issued the packet.

The details of path selection are discussed further with reference to FIGS. 16-17 below.

Relying entirely on integrity/trust scores to control data routing can create problems. For example, routers with higher integrity/trust scores might end up over utilized, and routers with lower integrity/trust scores (or no integrity/trust scores) might end up underutilized. Accordingly, one embodiment of the invention also attempts to balance these factors.

Data can be flagged based on its sensitivity to trustworthiness. (In this context, "sensitivity" should not be read as referring to a level of secrecy, but rather as referring to a preference that the data be transmitted based on some integrity/trust score factor(s). But a person skilled in the art will recognize that the secrecy of the data can be related to the desired level of trustworthiness of the routers used to transmit the data.) Among other possibilities, data can be flagged to indicate that the data should not be transmitted by a router with less than some threshold integrity/trust score. Or, the data can be flagged to indicate the data should not be transmitted if the average integrity/trust score falls below some threshold. A person skilled in the art will recognize other conditions that can be imposed on the delivery of the data that utilizes integrity/trust score information.

Where data is flagged in the above-described manner, it is possible to select paths based on both integrity/trust scores and other factors, such as load balancing. Data that is flagged as sensitive to trustworthiness can be routed based on the integrity/trust scores of routers in the network, and data that is not considered sensitive can be routed based on factors such as load balancing.

In addition to the network including routers with different integrity/trust scores, it can occur that the network includes some routers with integrity/trust scores, and some without. For example, a router might be temporarily without a current trust report, or a router in the network might not include the necessary hardware/software to use trust reports. In this situation, routers that have integrity/trust scores can be selected for data transmission instead of routers that lack integrity/trust scores, if possible (it might occur that the only way to reach a particular destination passes through a router that does not have an integrity/trust score). Alternatively, if data is flagged as described above, sensitive data can be routed using routers with integrity/trust scores (and more specifically, routers with integrity/trust scores that meet the requirements associated with the flagged data), and data that is not sensitive can be routed using routers that lack integrity/trust scores.

The network administrator can also establish policies to determine how to route data if the loads become too high. For example, even if data is flagged based on sensitivity, the loads on the routers in the network might still become unbalanced. The network policy could then indicate that data should be routed based on loads rather than integrity/trust scores (either for a short time or until the network administrator instructs otherwise).

Figure 9:
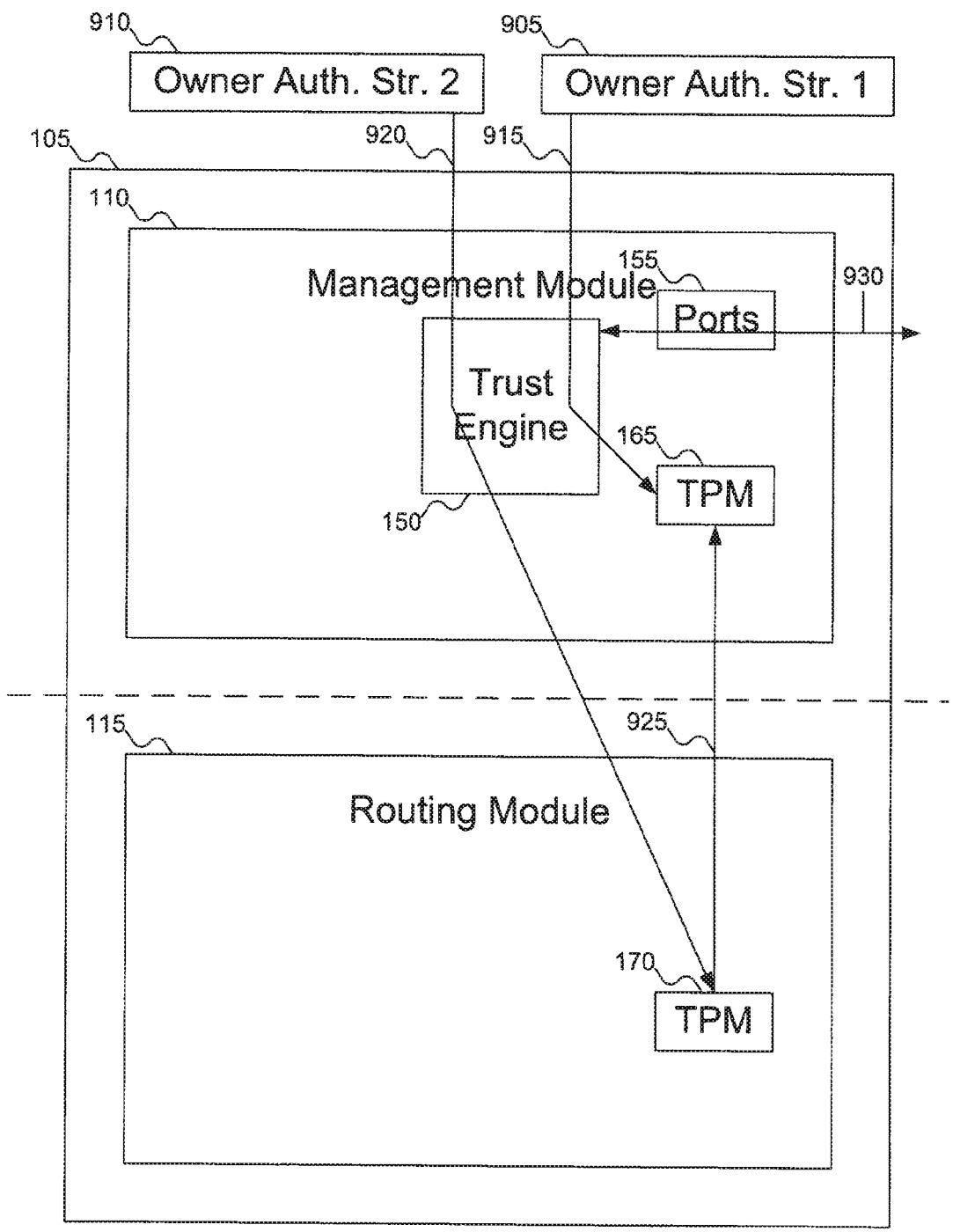
FIG. 9 shows the use of owner authentication strings in the router of FIG. 1 to configure the router.

FIG. 9 shows the use of owner authentication strings in the router of FIG. 1 to configure the router. Owner authorization strings, such as strings 905 and 910, provide information that shows the use of the TPM is authorized, which is part of activating the TPMs. An example of such strings might be passwords.

As discussed above with reference to FIG. 1, both management module 110 and routing module 115 include TPMs. As part of initially configuring a TPM, an owner provides an owner authorization string. Because there are two TPMs in router 105, and because management module 110 is supposed to manage router module 115, configuring the TPMs uses a special procedure.

First, TPM 165 is activated. The network administrator provides owner authorization string 905 to TPM 165, as shown by arrow 915. The network administrator can use the secure APIs of trust engine 150.

Next, TPM 170 is activated. The network administrator provides owner authorization string 910 to TPM 170, as shown by arrow 920. Again, the network administrator can use the secure APIs of trust engine 150.

Owner authorization string 910 also needs to be copied to TPM 165, as shown by arrow 925. By providing owner authorization string 910 to TPM 165, TPM 165 is enabled to manage routing module 115: for example, trust engine 150 can access TPM 170.

Finally, the network administrator establishes a secure channel between management module 110 and the network management console (NMC) that can remotely manage the router. This secure channel can be established using a security association between management module 110 and the NMC. The Security Association can include the creation of a shared Master Key between the MM and the NMC, from which short-lived session keys are established. The secure channel can then be created using standard security protocols and technologies (e.g. Internet Protocol Security (IPsec)/IKE, TLS/SSL, etc.), using the session keys.

Figure 10:
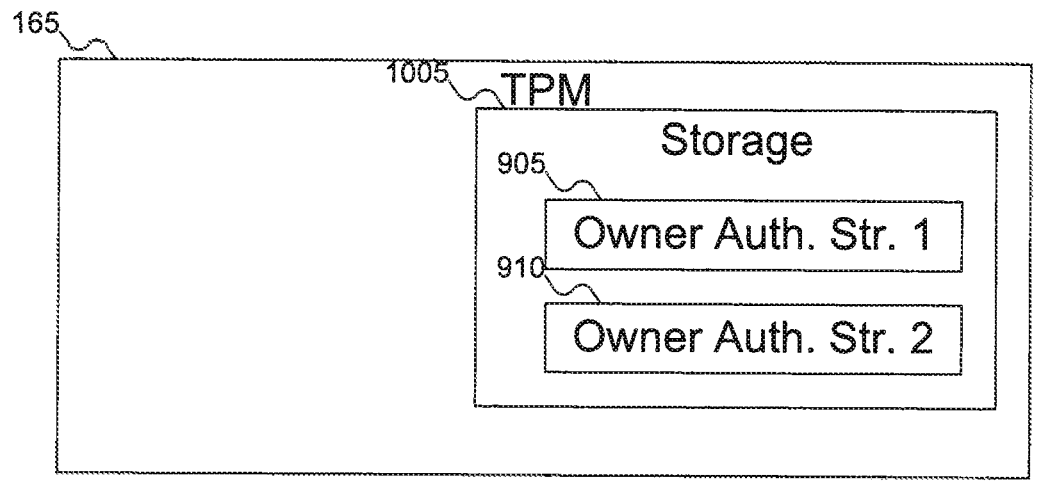
FIG. 10 shows details of the trusted hardware in the router of FIG. 1.

FIG. 10 shows details of the trusted hardware in the router of FIG. 1. As discussed above, TPM 165 stores owner authorization strings 905 and 910 for both TPM 165 and 170 (not shown in FIG. 10). FIG. 10 shows TPM 165 with storage 1005 that stores owner authorization strings 905 and 910. TPM 170 has a similar storage, although TPM 170 would not store owner authorization string 905 in its storage.

Figure 11:
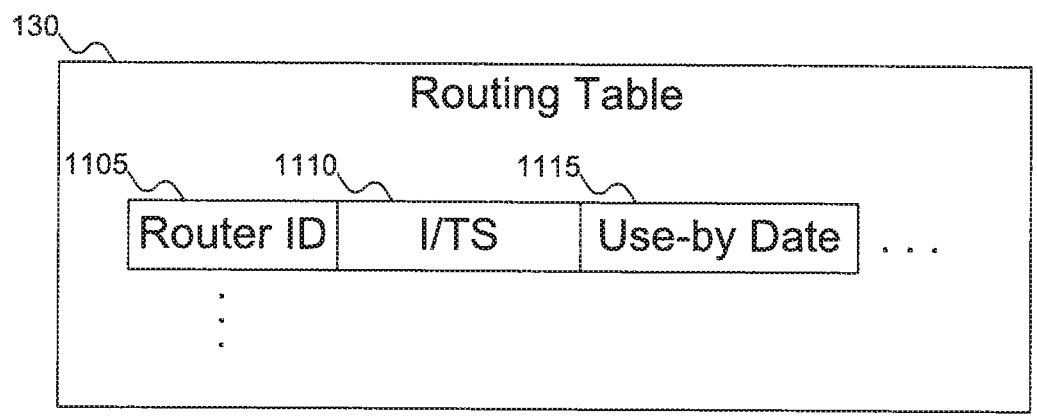
FIG. 11 shows details of a routing table used by the router of FIG. 1 in routing data.

FIG. 11 shows details of a routing table used by the router of FIG. 1 in routing data. As discussed above, routing table 130 includes information used by the router for routing data around the network. Such information includes information about the routers in the network: for example, the other routers in the network to which each router connects (i.e., the topology of the network), protocols used by the routers, and so on. The information can be formatted in any desired manner. In FIG. 11, routing table 130 is shown in columnar format, but a person skilled in the art will recognize other forms that can be used.

To support the use of integrity/trust scores in routing, routing table 130 is shown as including additional information. For example, routing table 130 is shown as including columns for identification of routers 1105, integrity/trust scores 1110, and use-by dates 1115. The integrity/trust score column 1110 stores the integrity/trust scores for the routers. The use-by date column 1115 stores information about the dates after which the integrity/trust scores should be discarded. For example, an integrity/trust score for a particular router might have a use-by date of one hour. (Equivalently, use-by date column 1115 can store a date or time, after which the integrity/trust score should be discarded.) After the hour is passed, the integrity/trust score for the router should be discarded (and hopefully, replaced with a new integrity/trust score). A person skilled in the art will recognize that different routers can have different use-by dates, not only in terms of schedule but in terms of duration. For example, router table 130 can indicate that one router's integrity/trust score, which had been received 5 minutes previously, should be discarded after one hour, but another router's integrity/trust score, received one hour ago, should be used for 24 hours before discarding. A person skilled in the art will also recognize that use-by date column 1115 can use multiples of any desired interval, be it fractions of a second, seconds, minutes, hours, days, etc.

In another embodiment, use-by date column 1115 is replaced with a column storing when the trust report was received by the router. If a network administrator has set a policy for expiration of trust reports, then the router can use the current date/time and the policy to determine whether the data in integrity/trust score column 1110 is still considered reliable, and can treat a router as unreliable if its integrity/trust score is too out-of-date.

Figure 12:
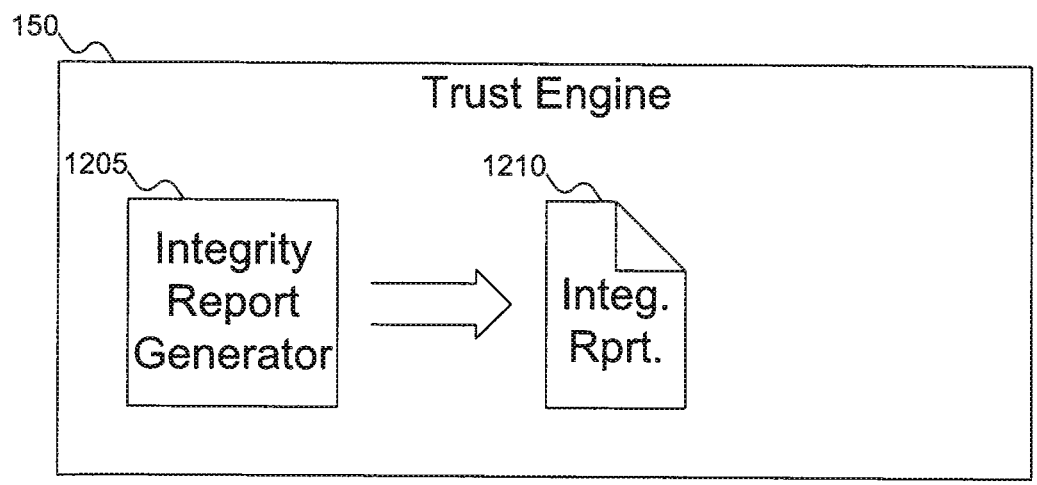
FIG. 12 shows details of an integrity report generator generating an integrity report for the router of FIG. 1.

FIG. 12 shows details of an integrity report generator generating an integrity report for the router of FIG. 1. Trust engine 150 includes integrity report generator 1205. As discussed above, integrity report generator is responsible for generating integrity report 1210 for the router. Integrity report 1210 includes information about the various components, hardware and/or software, in the router, that can be used in generating the trust report for the router.

Details of the operation of integrity report generator 1205 can be found in related U.S. patent application Ser. No. 11/608,742, titled, "METHOD TO VERIFY THE INTEGRITY OF COMPONENTS ON A TRUSTED PLATFORM USING INTEGRITY DATABASE SERVICES", filed Dec. 8, 2006, which is incorporated by reference. As discussed above with reference to FIG. 1, integrity report 1210 includes integrity records for the components in the router. The integrity records provide information about components, hardware and/or software, in the router. Such information can include, but is not limited to, the name of the component, its version and patch level, and a digest of the component. The digest of the component can be computed as a cryptographic hash of the component, for example using cryptographic hash functions such as MD5, SHA-1, and/or SHA-256. Integrity report 1210 can then be provided to an entity that is generating a trust report for the router, such as an authentication/verification server as shown in FIGS. 2-3 or another router as shown in FIGS. 4-5. The integrity report can optionally be signed using one of the keys and/or certificates in the TPM if desired.

Figure 13:
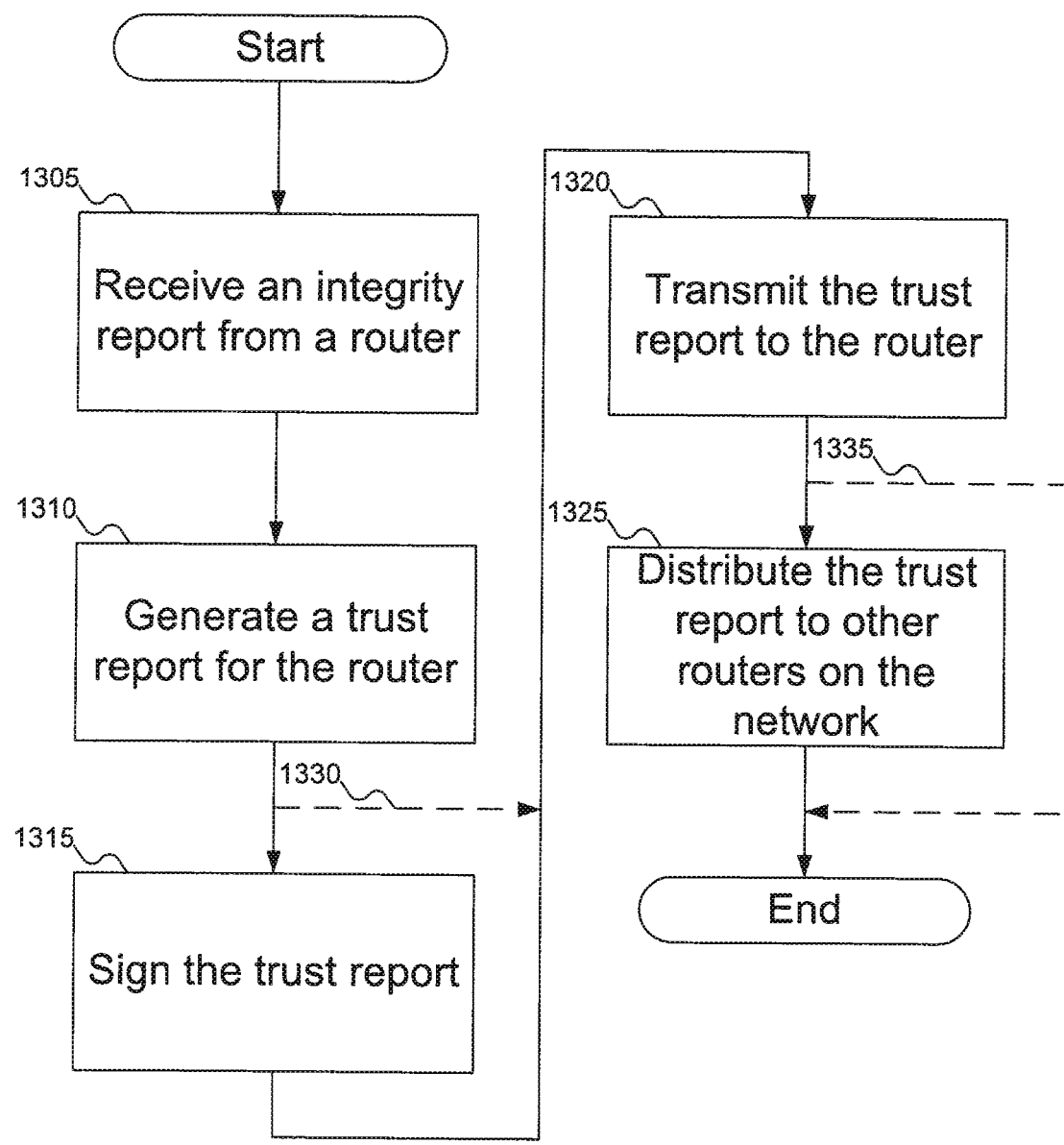
FIG. 13 shows a flowchart of the procedure for generating an integrity/trust score for the router of FIG. 1, according to an embodiment of the invention.

FIG. 13 shows a flowchart of the procedure for generating an integrity/trust score for the router of FIG. 1, according to an embodiment of the invention. In FIG. 13, at step 1305, an integrity report is received from a router. As discussed above with reference to FIGS. 2-5, the recipient of the integrity report can be an authentication/verification server or another router. At step 1310, the recipient of the integrity report uses the integrity report to generate a trust report for the router. As discussed above, the trust report can include an integrity/trust score for the router. At step 1315, the generator of the trust report signs the trust report. At step 1320, the trust report is transmitted to the router. Finally, at step 1325, the trust report can be distributed to other routers in the network. As shown by arrows 1330 and 1335, steps 1315 and 1325 can be omitted, in which case the trust report is unsigned, and the trust report is not distributed beyond the target router, respectively.

Figure 14:
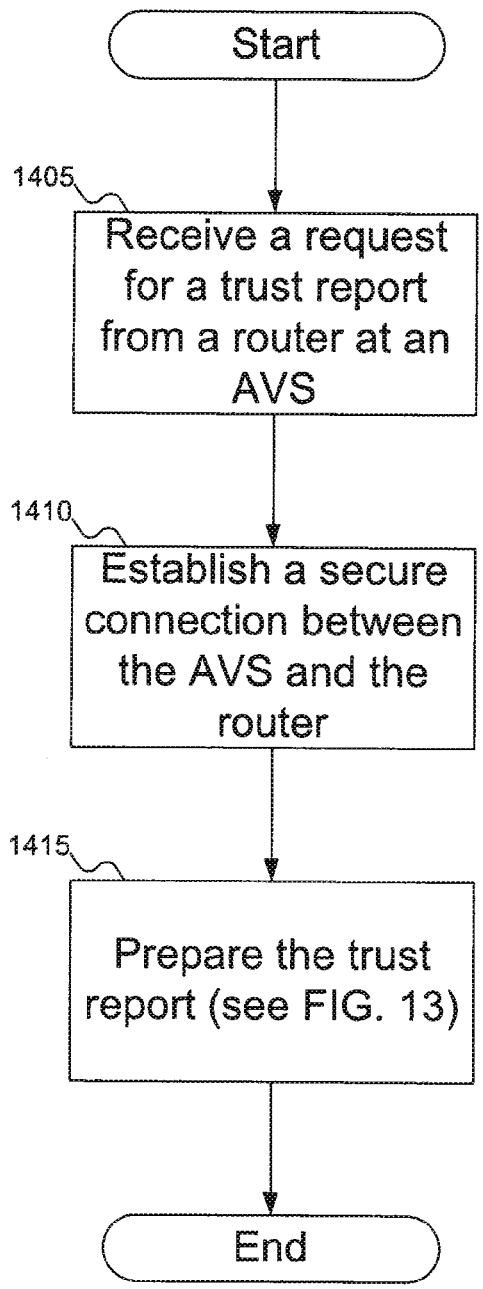
FIG. 14 shows a flowchart of the procedure for an authentication/verification server to generate the trust report as explained in FIG. 13, according to an embodiment of the invention.

FIG. 14 shows a flowchart of the procedure for an authentication/verification server to generate the trust report as explained in FIG. 13, according to an embodiment of the invention. In FIG. 14, at step 1405, an authentication/verification server (AVS) receives a request for a trust report from a router. At step 1410, the authentication/verification server and the router establish a secure connection. At step 1415, the authentication/verification server prepares the trust report, as described above with reference to FIG. 13.

Figure 15:
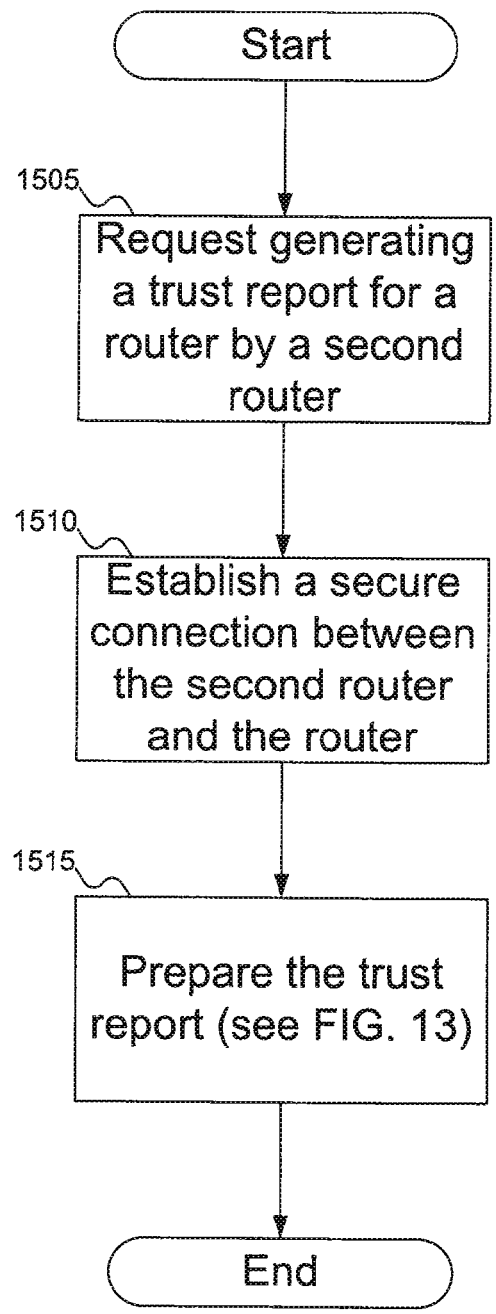
FIG. 15 shows a flowchart of the procedure for the router of FIG. 1 to generate the trust report as explained in FIG. 13, according to an embodiment of the invention.

FIG. 15 shows a flowchart of the procedure for the router of FIG. 4 to generate the trust report as explained in FIG. 13, according to an embodiment of the invention. In FIG. 15, at step 1505, a second router issues a request to a router to generate a trust report. At step 1510, the router and the second router establish a secure connection. At step 1515, the second router prepares the trust report, as described above with reference to FIG. 13.

Figure 16:
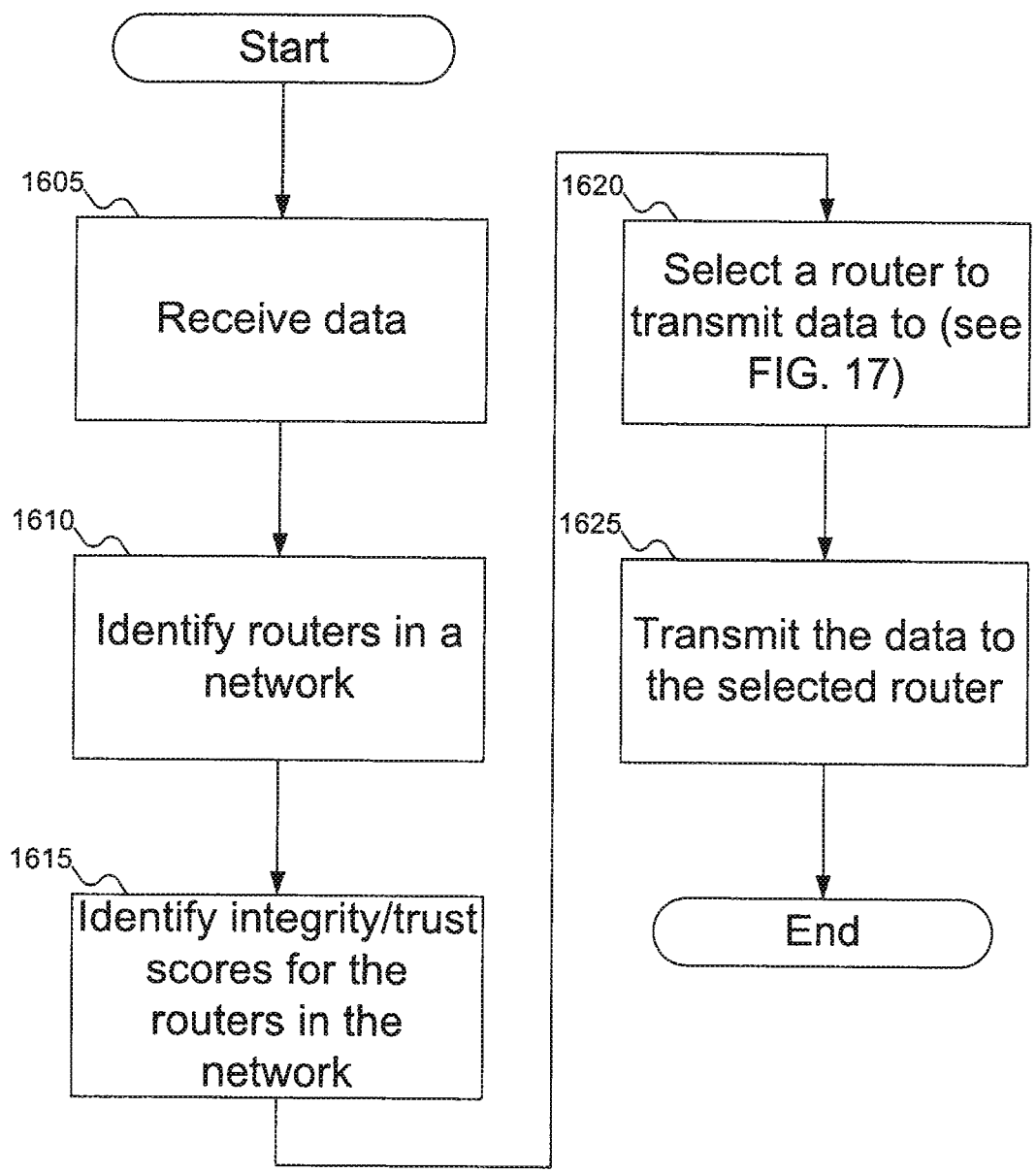
FIG. 16 shows a flowchart of the procedure for the router of FIG. 1 to select a router to transmit data, according to an embodiment of the invention.

FIG. 16 shows a flowchart of the procedure for the router of FIG. 1 to select a router to transmit data, according to an embodiment of the invention. In FIG. 16, at step 1605, the router receives data from somewhere on the network. At step 1610, the router identifies other routers in the network. This identification might involve identifying all routers in the network, or only a subset of the routers. At step 1615, the router identifies integrity/trust scores for the routers in the network (or at least the routers in the network the router could identify). As discussed above with reference to FIG. 11, the integrity/trust score can be determined from routing table 130, if routing table 130 is modified to include such information. At step 1620, the router selects another router to which the data should be transmitted, as discussed below with reference to FIG. 17. Finally, at step 1625, the router transmits the data to the selected router.

Figure 17:
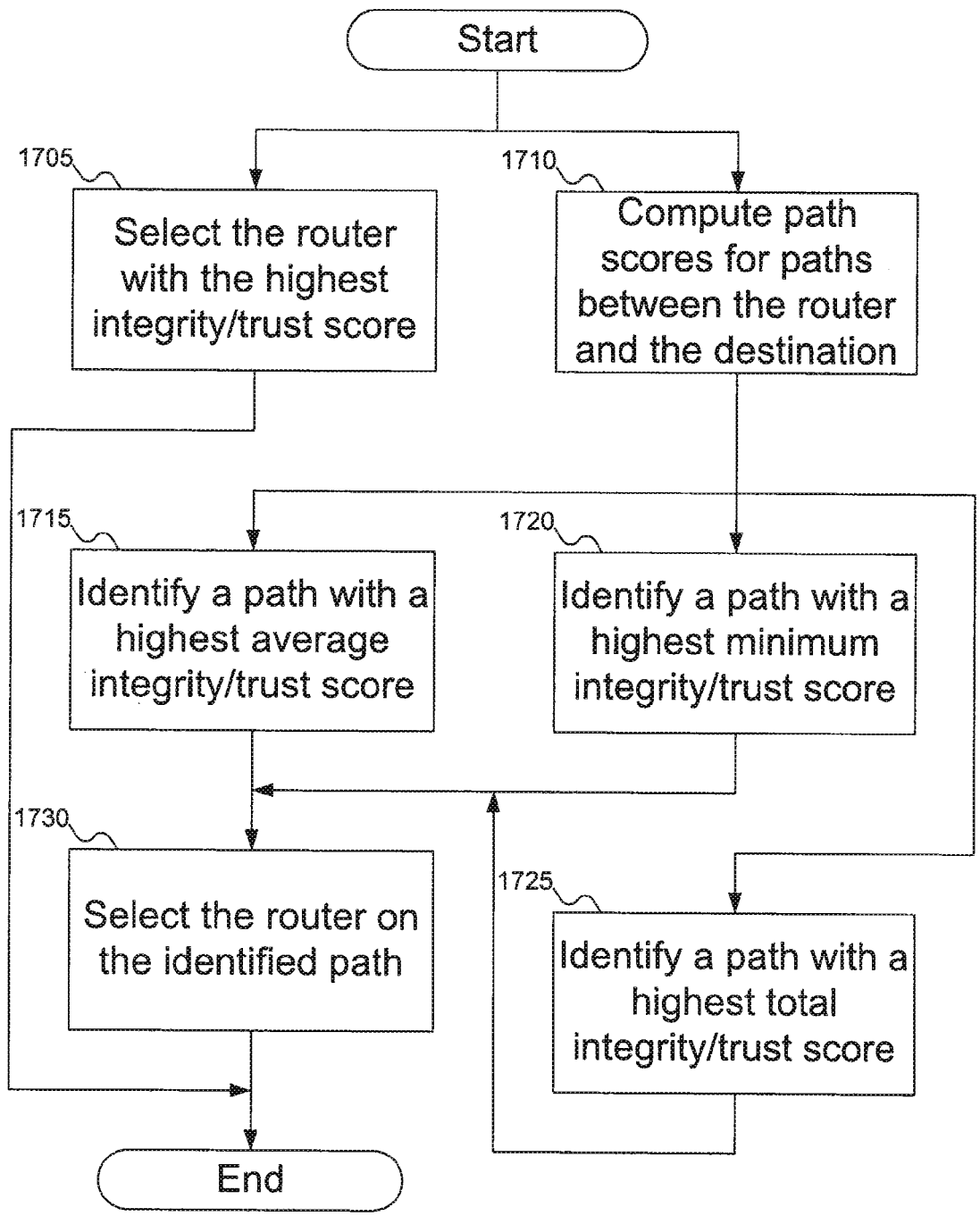
FIG. 17 shows a flowchart of the procedure for selecting a path for the router of FIG. 1 to use in transmitting data, according to an embodiment of the invention.

FIG. 17 shows a flowchart of the procedure for selecting a path for the router of FIG. 1 to use in transmitting data, according to an embodiment of the invention. At step 1705, the router can select the destination router for the data (of FIG. 16) based on the adjacent router with the highest integrity/trust score. Alternatively, at step 1710, if the router has information about the entire network, the router can compute path scores for some or all paths between the router and the ultimate destination of the data. A "path score" for a given path represents some function of the integrity/trust scores of the routers along the path. Examples of potential path score functions can include the sum of all integrity/trust scores of routers along the path, the average of the integrity/trust scores of routers along the path, the minimum integrity/trust score of all routers along the path, the maximum integrity/trust score of all routers along the path, and so on. A person skilled in the art will recognize other possible path score functions.

Once the path scores have been computed, the router can select a destination router using any desired technique. FIG. 17 shows three such techniques. In step 1715, the router selects the path based on the highest average integrity/trust score. In step 1720, the router selects the path based on the highest minimum integrity/trust score (i.e., the path along which the minimum router integrity/trust score is the highest). In step 1725, the router selects the path based on the highest total (sum) of the integrity/trust scores of the routers along the path. A person skilled in the art will recognize other techniques that can be used to select the path. Finally, once the path is selected, at step 1730, the router selects the next adjacent router along that path as the immediate destination for the data.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc. The machine may also be implemented as a virtual machine, running on a platform designed to support virtual machines; such platform may include the appropriate hardware and/or software to support the virtual machine.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, an article such as the volatile and/or non-volatile memory, e.g., RAM, ROM, etc., or in other articles such as other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A method for selecting a second router as part of a path from a first router to a destination, comprising:
    identifying a plurality of routers that are part of a network including the first router;
    identifying at least a first portion of the identified routers as each having an integrity/trust score;
    flagging first data as being sensitive to trustworthiness;
    identifying from among only the first portion of the identified routers a first path between the first router and the destination;
    selecting a second router from said identified first path; and
    transmitting the first data that is flagged as being sensitive to trustworthiness from the first router to the second router;
    identifying a second portion of the identified routers;
    identifying from among the second portion of the identified routers a second path between the first router and the destination;
    selecting a third router from said identified second path; and
    transmitting second data that is not flagged as being sensitive to trustworthiness from the first router to the third router based on a load balancing factor between the first path and the second path,
    wherein the third router includes either no integrity/trust score or an integrity/trust score that is lower than the integrity/trust score of the second router.

2. A method according to claim 1, further comprising:
    identifying the second portion of the identified routers as each not having an integrity/trust score;
    identifying from among only the second portion of the identified routers the second path between the first router and the destination;
    selecting the third router from said identified second path; and
    transmitting second data that is not flagged as being sensitive to trustworthiness from the first router to the third router.

3. A method according to claim 1, wherein the first path includes an average integrity/trust score that is higher than the average integrity/trust score of the second path, the method further comprising:
    selecting the second router from said identified first path having the higher average integrity/trust score;
    transmitting the first data from the first router to the destination through the second router and through the first portion of the plurality of routers along said identified first path;
    selecting the third router from said identified second path; and
    transmitting the second data from the first router to the destination through the third router and through the second portion of the plurality of routers along said identified second path.

4. A router, comprising:
    a management module, including:
        a trust engine; and
        a first trusted hardware configured to receive a first owner authorization string of a network administrator using a secure interface of the trust engine and to store the first owner authorization string;
    a routing module, including:
        a second trusted hardware configured to receive a second owner authorization string of the network administrator using the secure interface of the trust engine, to store the second owner authorization string, and to transmit a copy of the second owner authorization string to the first trusted hardware, wherein the first trusted hardware is configured to store the second owner authorization string received from the second trusted hardware;
    storage configured to store information about at least one adjacent router, said information including an integrity/trust score for at least one of said adjacent router; and
    a path selection module to select a first of said adjacent routers along which to route a first packet that is flagged as being sensitive to trustworthiness based at least on said integrity/trust score for at least one of said adjacent router, the path selection module operative to select a second of said adjacent routers along which to route a second packet that is not flagged as being sensitive to trustworthiness based on a load balancing factor between the first path and the second path,
    wherein the second of said adjacent routers includes either no integrity/trust score or an integrity/trust score that is lower than the integrity/trust score of the first of said adjacent routers.

5. A router according to claim 4, further comprising:
    a secure control interface for the management module to control the routing module.

6. A router according to claim 4, wherein the routing module is operable when the management module is not operable.

7. A router according to claim 4, wherein:
    the management module includes a first power supply; and
    the routing module includes a second power supply,
    wherein if the first power supply fails, the routing module continues to operate using the second power supply in the absence of an operating management module.

8. A router according to claim 4, wherein the first trusted hardware includes a trusted platform module.

9. A router according to claim 4, wherein the second trusted hardware includes a trusted platform module.

10. A router according to claim 4, wherein the management module further includes an interface for storing said second owner authorization string in the second trusted hardware, said interface for copying said second owner authorization string from said second trusted hardware to the first trusted hardware to enable the first trusted hardware to manage the routing module.

11. A router according to claim 4, wherein the management module is operative to analyze the routing module using the trust engine upon a boot-up of the routing module.

12. A router according to claim 4, wherein the management module is operative to use the trust engine to determine an integrity/trust score for a second router.

13. A router according to claim 4, wherein the management is operative to communicate with an authentication/verification server to determine an integrity/trust score for the router.

14. A router according to claim 4, wherein the storage for information includes an acceptable-use-by date parameter associated with the integrity/trust score, and
the router further comprises a path selection module to select one of said adjacent routers along which to route a packet based at least on said integrity/trust score for each said adjacent router and said acceptable-use-by date parameter.

15. A router according to claim 4, wherein the trust engine includes an integrity report generator to generate an integrity report for at least one of the management module and the routing module.

16. An article comprising a non-transitory storage-readable medium having associated data that, when executed by a machine, results in a machine:
identifying a plurality of routers that are part of a network including the first router;
identifying a first portion of the identified routers as each having an integrity/trust score;
flagging data as being sensitive to trustworthiness;
identifying from among only the first portion of the identified routers a first path between the first router and the destination;
selecting a second router from said identified first path;
transmitting the data that is flagged as being sensitive to trustworthiness from the first router to the second router;
identifying a second portion of the identified routers;
identifying from among the second portion of the identified routers a second path between the first router and the destination;
selecting a third router from said identified second path; and
transmitting second data that is not flagged as being sensitive to trustworthiness from the first router to the third router based on a load balancing factor between the first path and the second path,
wherein the third router includes either no integrity/trust score or an integrity/trust score that is lower than the integrity/trust score of the second router.

17. An article according to claim 16,
the non-transitory storage-readable medium having associated data that, when executed by a machine, further results in a machine:
identifying the second portion of the identified routers as each not having an integrity/trust score;
identifying from among only the second portion of the identified routers the second path between the first router and the destination;
selecting the third router from said identified second path; and
transmitting second data that is not flagged as being sensitive to trustworthiness from the first router to the third router.

* * * * *